US010080148B2

(12) United States Patent
Byun et al.

(10) Patent No.: US 10,080,148 B2
(45) Date of Patent: Sep. 18, 2018

(54) METHOD OF TRANSMITTING, BY BASE STATION, SIGNAL FOR COMPENSATING FOR COVERAGE IN WIRELESS COMMUNICATION SYSTEM, AND APPARATUS THEREFOR

(71) Applicant: LG ELECTRONICS INC., Seoul (KR)

(72) Inventors: Daewook Byun, Seoul (KR); Kyungmin Park, Seoul (KR); Jian Xu, Seoul (KR); Insun Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 14/900,564

(22) PCT Filed: Jun. 20, 2014

(86) PCT No.: PCT/KR2014/005480
§ 371 (c)(1),
(2) Date: Dec. 21, 2015

(87) PCT Pub. No.: WO2014/204270
PCT Pub. Date: Dec. 24, 2014

(65) Prior Publication Data
US 2016/0150420 A1 May 26, 2016

Related U.S. Application Data

(60) Provisional application No. 61/837,644, filed on Jun. 21, 2013.

(51) Int. Cl.
H04W 24/02 (2009.01)
H04W 36/00 (2009.01)
(Continued)

(52) U.S. Cl.
CPC ............ *H04W 24/02* (2013.01); *H04W 4/06* (2013.01); *H04W 16/08* (2013.01);
(Continued)

(58) Field of Classification Search
CPC ....... H04W 24/02; H04W 4/06; H04W 16/08; H04W 92/20; H04W 36/0005; H04W 52/0206; Y02B 60/50; H04L 12/189
See application file for complete search history.

(56) References Cited

U.S. PATENT DOCUMENTS

2011/0170466 A1* 7/2011 Kwun ............... H04W 52/0235
370/311
2012/0155364 A1* 6/2012 Kim ........................ H04W 4/06
370/312

(Continued)

FOREIGN PATENT DOCUMENTS

| KR | 10-2012-0122149 | 11/2012 |
| KR | 10-2013-0038763 | 4/2013 |
| WO | 2012/074325 | 6/2012 |

OTHER PUBLICATIONS

PCT International Application No. PCT/KR2014/005480, Written Opinion of the International Searching Authority dated Sep. 25, 2014, 15 pages.

(Continued)

Primary Examiner — Kwang B Yao
Assistant Examiner — Moo Ryong Jeong
(74) Attorney, Agent, or Firm — Lee Hong Degerman Kang Waimey

(57) ABSTRACT

The present invention relates to a method of transmitting, by a base station, a signal for compensating for coverage in a wireless communication system, and an apparatus therefor. A method of transmitting, by a base station, a signal for compensating for coverage, comprises: receiving information indicating that a first base station is a base station
(Continued)

supporting a multimedia broadcast/multicast service (MBMS), from the first base station in a state enabling switching off; receiving a coverage compensation request message containing MBMS-related information of the first base station from the first base station; and transmitting, by a compensation base station to the first base station, a coverage compensation response message indicating whether it is possible to compensate for the coverage of the first base station, wherein whether it is possible to compensate for the coverage of the first base station is determined on the basis of the MBMS-related information.

8 Claims, 9 Drawing Sheets

(51) Int. Cl.
*H04W 52/02* (2009.01)
*H04W 4/06* (2009.01)
*H04W 16/08* (2009.01)
*H04L 12/18* (2006.01)
*H04W 92/20* (2009.01)

(52) U.S. Cl.
CPC ... *H04W 36/0005* (2013.01); *H04W 52/0206* (2013.01); *H04L 12/189* (2013.01); *H04W 92/20* (2013.01)

(56) References Cited

U.S. PATENT DOCUMENTS

2013/0051298 A1\* 2/2013 Drevo ............... H04W 36/0083 370/312
2013/0150044 A1 6/2013 Zhang et al.
2016/0066236 A1\* 3/2016 Comstock ......... H04W 52/0254 370/331

OTHER PUBLICATIONS

CMCC, et al., "Addition of Energy Saving funtion for Inter-RAT scenario," 3GPP TSG-RAN WG3 #76, R3-121479, May 2012, 2 pages.

\* cited by examiner

METHOD OF TRANSMITTING, BY BASE STATION, SIGNAL FOR COMPENSATING FOR COVERAGE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/005480, filed on Jun. 20, 2014, which claims the benefit of U.S. Provisional Application No. 61/837,644, filed on Jun. 21, 2013, the contents of which are all hereby incorporated by reference herein in their entirety.

TECHNICAL FIELD

The present invention relates to a method of transmitting a signal, which is transmitted by a base station for coverage compensation in a wireless communication system, and an apparatus therefor.

BACKGROUND ART

Generally, a wireless communication system that includes a base station (BS) and a user equipment (UE) provides the user equipment with various kinds of communication services including voice or data through one or more base stations. Generally, one base station may provide one or more cells.

The recent trend in a structure of the wireless communication system is that a macro cell based centralized base station type corresponding to a conventional vertical layer is being switched to a base station type in which various types of small cells such as a pico cell and a femto cell interact with a macro cell.

Meanwhile, as efforts to reduce the greenhouse effect and environment destruction, which are caused by excessive emission of $CO_2$, have been increased, an element that best emits $CO_2$ in the field of mobile communication is regarded as a power of a base station, and an important issue is how the power of the base station may be reduced or how the power of the base station may be used efficiently.

It has been until recently focused on efficient use in a power of a user equipment and decrease of energy consumption of the user equipment to increase portability of the user equipment. However, in the future, the power of the base station may be used efficiently to reduce energy consumption, whereby emission of $CO_2$ may be reduced and operation expenditure (OPEX) may be saved.

Therefore, the need of technology development for reducing power consumption of the base station through efficient energy consumption of the base station has been increased, and from Release 9 in the 3GPP (3rd Generation Partnership Project), energy saving solution in view of the base station has been discussed, and in Release 12, technologies for energy saving of long term evolution (LTE) base stations at an off-peak time have been discussed.

For energy saving of the base station, it may be considered that the base station is shifted to a power-off state or idle mode. In this case, the base station that is shifted to the power-off mode or idle mode may perform handover for user equipments located in its coverage area to neighboring base stations that may compensate for a coverage of the base station.

However, since there is no separate signaling procedure between the base station and the neighboring base stations, a problem may occur in that the neighboring base stations may not compensate for the coverage of the base station normally, whereby handover may be failed or service quality may remarkably be deteriorated.

In particular, when the base station supports MBMS (multimedia broadcast/multicast service), since the base station does not have a separate signaling procedure with a neighbor base station, the base station and the neighbor base station may be unaware of whether or not the base station and the neighbor base station support the MBMS.

Under this situation, if it is determined to compensate for coverage of the base station by the neighbor base station, the base station performs a transition to a power-off state or an idle state. In this case, the neighbor base station attempts to compensate for the coverage of which the MBMS service used to be provided by the base station. Yet, if the neighbor base station corresponds to a base station not supporting the MBMS, user equipments, which have been received the MBMS service from the base station, are unable to receive an MBMS signal anymore. Hence, service interruption may occur.

Therefore, it is necessary to introduce a method capable of compensating for the coverage of the base station without a missing part and a solution for the same.

DISCLOSURE OF THE INVENTION

Technical Tasks

The present invention is proposed to solve the aforementioned legacy necessity. An object of the present invention is to provide a method for a neighbor base station to compensate for all coverage of a base station intending to switch to a power-off or an idle state in a wireless communication system.

Another object of the present invention is to provide a method of recognizing a base station providing a mutual MBMS service between a base station intending to switch to a power-off or an idle state and a neighbor base station.

Another object of the present invention is to provide a method of preventing a service interruption from being occurred in a manner that user equipments, which have received an MBMS service from a base station intending to switch to a power-off or an idle state, continuously receive the MBMS service from a neighbor base station.

The other object of the present invention is to provide a device supporting the aforementioned methods.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To solve the aforementioned technical problem, according to one embodiment of the present invention, a method of transmitting a signal for coverage compensation transmitted by a compensation base station in a wireless communication system, the method comprising: receiving, from a first base station, information indicating that the first base station supports an MBMS (multimedia broadcast/multicast service) service the first base station being in a state of which switching off is available; receiving, from the first base station, a coverage compensation request message containing MBMS-related information of the first base station; transmitting, to the first base station, a coverage compensation response message indicating whether or not the compensation base station is able to compensate for coverage of the first base station, wherein whether or not coverage compensation of the first base station is feasible is determined based on the MBMS-related information.

To solve the aforementioned technical problem, performing an X2 interface configuration procedure between the compensation base station and the first base station, wherein the information indicating that the first base station supports the MBMS service is received in the X2 interface configuration procedure.

To solve the aforementioned technical problem, transmitting the information indicating that the compensation base station supports the MBMS service to the first base station in the X2 interface configuration procedure.

To solve the aforementioned technical problem, the received coverage compensation request message comprises the information indicating that the first base station supports the MBMS service and the MBMS-related information, and wherein the MBMS-related information comprises information indicating whether or not there exists a user to which the MBMS service is provided by the first base station.

To solve the aforementioned technical problem, transmitting the coverage compensation request message to an MBMS coordinating entity (MCE); and receiving a result for whether or not the coverage compensation of the first base station is feasible determined by the MCE from the MCE.

To solve the aforementioned technical problem, the compensation base station determines whether or not the coverage compensation of the first base station is feasible based on the MBMS-related information and wherein a determined result for whether or not the coverage compensation of the first base station is feasible is transmitted to an MBMS coordinating entity (MCE) and the first base station.

To solve the aforementioned technical problem, if there exist a plurality of compensation base stations, a predetermined master compensation base station among a plurality of the compensation base stations transmits the coverage compensation request message to an MBMS coordinating entity (MCE), and wherein the master compensation base station receives a result for whether or not the coverage compensation of the first base station is feasible determined by the MCE from the MCE and transmits the result to the first base station.

To solve the aforementioned technical problem, if there exist a plurality of compensation base stations and there is no predetermined master compensation base station among a plurality of the compensation base stations, each of a plurality of the compensation base stations transmits the coverage compensation request message to an MBMS coordinating entity (MCE), and wherein each of a plurality of the compensation base stations receives a result for whether or not the coverage compensation of the first base station is feasible determined by the MCE from the MCE and transmits the result to the first base station.

To solve the aforementioned technical problem, the coverage compensation response message is used for the first base station to directly determine switching off and whether to perform coverage compensation.

To solve the aforementioned technical problem, the coverage compensation request message is received from the first base station in case that a cell load of the first base station maintains a value equal to or less than a predetermined threshold during time determined in advance.

To solve the aforementioned technical problem, the compensation base station compensates for the coverage of the first base station by providing the MBMS service continuously to one or more user equipments to which the MBMS service is provided from the first base station.

To solve the aforementioned technical problem, a coverage area of the compensation base station and a coverage area of the first base station are not overlapped with each other.

To solve the aforementioned technical problem, a device transmitting a signal for coverage compensation in a wireless communication system, comprising: an RF (radio frequency) unit containing a transmitter and a receiver; a processor configured to support communication of the device in a manner of being connected with the transmitter and the receiver, wherein the processor is further configured to: receive, from a first base station, information indicating that the first base station supports an MBMS (multimedia broadcast/multicast service) service the first base station being in a state of which switching off is available, receive, from the first base station, a coverage compensation request message containing MBMS-related information of the first base station, transmit, to the first base station, a coverage compensation response message indicating whether or not the compensation base station is able to compensate for coverage of the first base station, wherein whether or not coverage compensation of the first base station is feasible is determined based on the MBMS-related information.

Advantageous Effects

According to the present invention, it is able to compensate for all coverage of a base station intending to switch to a power-off or an idle state by a neighbor base station in a wireless communication system.

According to the present invention, it is able to recognize a base station providing a mutual MBMS service between a base station intending to switch to a power-off or an idle state and a neighbor base station.

According to the present invention, a base station intending to switch to an idle state and a neighbor base station can recognize a control base station.

According to the present invention, it is able to prevent a service interruption from being occurred in a manner that user equipments, which have received an MBMS service from a base station intending to switch to a power-off or an idle state, continuously receive the MBMS service from a neighbor base station.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In the specification, when a part "comprises" or "includes" an element, it means that the part further comprises or includes another element unless otherwise mentioned.

Also, the term " . . . module" disclosed in the specification means a unit for processing at least one function or operation, and may be implemented by hardware, software or combination of hardware and software. Moreover, it is to be understood that the singular expression "a" (or "an"), "one" and "a related similar word" used in this specification includes the plural expression unless defined differently on the context of the present invention.

Specific terms used in the embodiments of the present invention are provided to assist understanding of the present invention, and all terms used herein including technical or scientific terms have the same meaning as those generally understood by the person with ordinary skill in the art to which the present invention pertains. Various modifications may be made in the specific terms within the range that they do not depart from technical spirits of the present invention.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Figure 1:
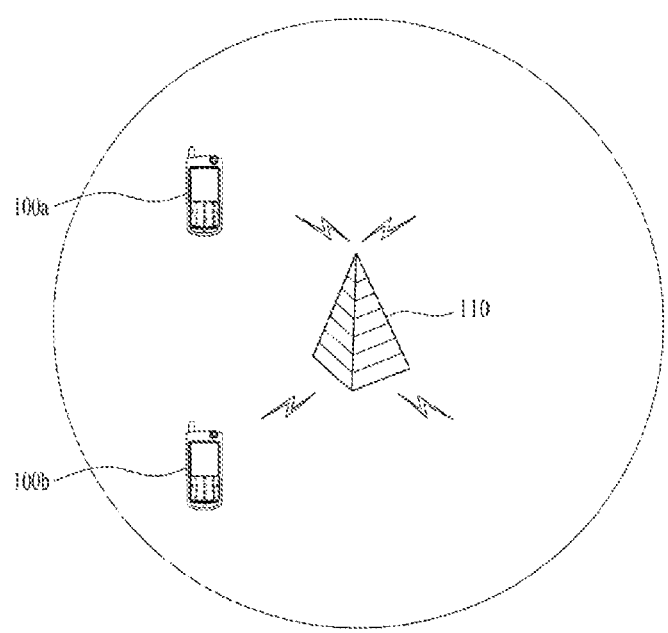
FIG. 1 is a diagram for an example of a general wireless communication system to which the present invention is applicable.

FIG. 1 is a diagram illustrating a general wireless access network system to which the present invention may be applied.

In FIG. 1, a general wireless access network system to which the present invention may be applied may include a base station (BS) 110 and one or more user equipments (UE) 100a and 100b.

In the present invention, the base station 110 means a terminal node of a network that directly performs communication with the user equipments 100a and 100b. Also, a specific operation described as being performed by the base station 110 may be performed by an upper node of the base station as the case may be.

In other words, it will be apparent that various operations performed for communication with the user equipment in the network which includes a plurality of network nodes along with the base station 110 may be performed by the base station or network nodes other than the base station.

In the present invention, the base station 110 may be replaced with terms such as a fixed station, Node B, eNode B (eNB), and access point (AP).

Also, the user equipment may be replaced with terms such as Terminal, MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, and D2D device (Device-to-Device).

The embodiments of the present invention may implemented in at least one of wireless access systems, i.e., IEEE system, 3GPP system, 3GPP LTE system, 3GPP LTE-A (LTE-Advanced) system, and 3GPP2 system, and may be supported by standard documents disclosed in at least one of the wireless access systems.

Figure 2:
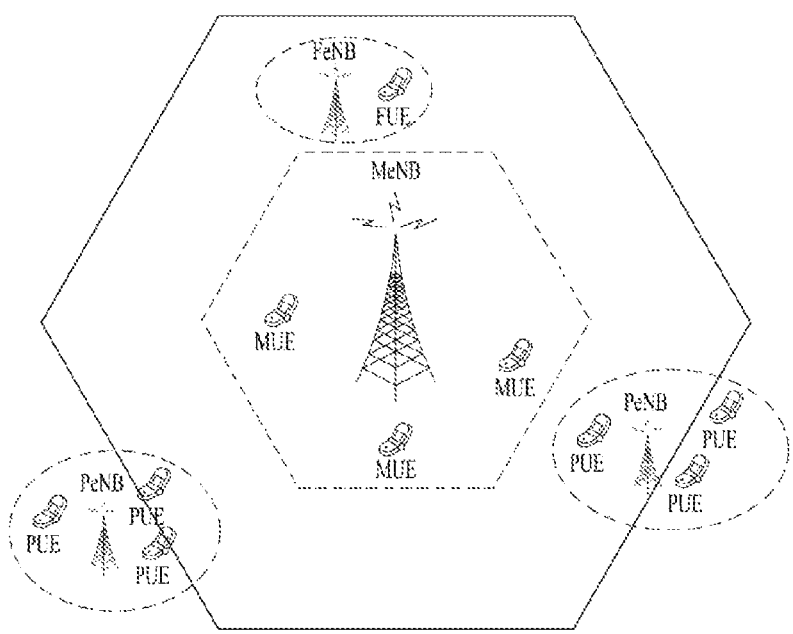
FIG. 2 is a diagram for heterogeneous network environment to which the present invention is applicable.

FIG. 2 is a diagram illustrating a heterogeneous network environment to which the present invention may be applied.

Adding macro cells to a conventional eNB deployment is inefficient in terms of cost and complexity relative to improved system performance. Therefore, to stably ensure data service such as multimedia data in a future-generation mobile communication system, more interest has been attracted to the introduction of a hierarchical cell structure or heterogeneous cell structure in which small cells (pico cells, femto cells and/or micro cells) for low-power/short-range communication are co-existent in a macro cell-based homogeneous network.

Meanwhile, a heterogeneous network under consideration for a current wireless communication system is configured as illustrated in FIG. 2. Referring to FIG. 2, a plurality of small cells may be co-existent in one macro cell. The base stations of each small cell are allocated resources by cell coordination and service user equipments UEs using the resources.

A coverage which is an area that may provide a user equipment UE with service exists in each of the small cells, and a coverage of a specific small cell may be compensated by a coverage of another neighboring small cell.

Figure 3:
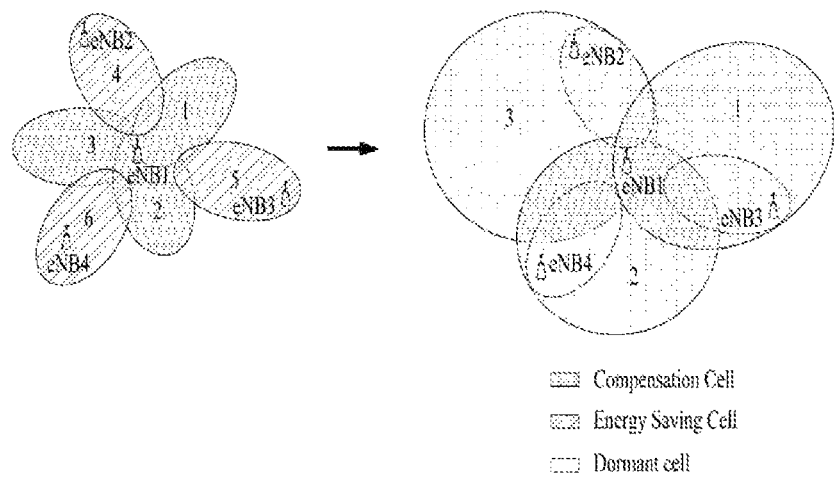
FIG. 3 is a diagram for environment of a single coverage compensation base station to which the present invention is applicable.
Figure 4:
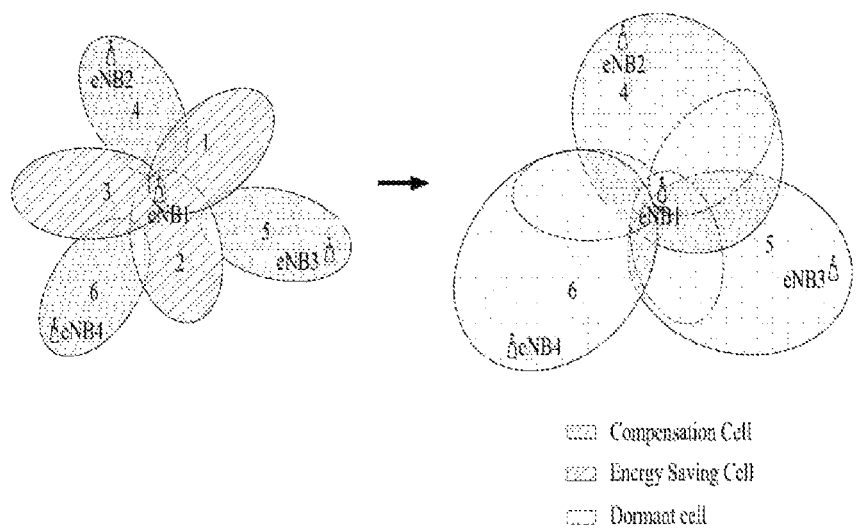
FIG. 4 is a diagram for environment of multiple coverage compensation base stations to which the present invention is applicable.

FIGS. 3 and 4 are diagrams illustrating an environment of a single coverage compensation base station and an environment of multiple coverage compensation base stations, to which the present invention may be applied.

At off-peak time, a base station almost having no UE that performs communication may exist. In order to reduce energy consumption of the base station, the power of the base station may be switched off or may be shifted to an idle mode, and a neighboring base station may widen its coverage to cover a service area of the base station which is powered off or shifted to the idle mode.

In this case, the base station which is powered off or shifted to the idle mode will be referred to as an energy saving cell or an energy saving base station, and the base station which widens its coverage to cover the area where the power is switched off or which is shifted to the idle mode will be referred to as a compensation cell or a compensation base station.

Two scenarios may be configured as illustrated in FIGS. 3 and 4 in accordance with distribution of the two types of base stations. In FIG. 3, cell 1 to cell 3 are compensation base stations, and cell 4 to cell 6 are energy saving base stations. In FIG. 4, cell 1 to cell 3 are energy saving base stations, and cell 4 to cell 6 are compensation base stations.

In respect of FIGS. 3 and 4, an energy saving approach method exists as follows. The energy saving approach method includes a method for determining an energy saving base station and a compensation base station, a method as to when and how the energy saving base station is powered off or shifted to the idle mode, and a method as to how the compensation base station coordinates its coverage.

The first method for the energy saving approach method is OAM based approach method (Operation and Management based Approach). The OAM based approach method is that the OAM previously configures an energy saving base station and a compensation base station and energy saving base stations are determined to be powered off or shifted to the idle mode on the basis of a proprietary algorithm.

The second method for the energy saving approach method is a signaling based approach method. According to the signaling based approach method, types of respective base stations are previously configured in the same manner as the OAM based approach method. However, according to the signaling based approach method, the time when the energy saving base station is powered off or shifted to the idle mode and thus the method as to how the compensation base station coordinates its coverage are determined through signaling between the base stations.

The third method for the energy saving approach method is an OAM and signaling hybrid based approach method (Hybrid OAM and Signaling based Approach). The OAM and signaling hybrid based approach method is the same as the above two methods in that OAM previously configures types of respective base stations but determines parameter values, which are required to allow the energy saving base station to be powered off or shifted to the idle mode, by communication between the OAM and the base stations.

The present invention especially considers the signaling based approach method of the energy saving approach methods, and also considers the environment of multiple coverage compensation base stations shown in FIG. 4 of two scenarios shown in FIGS. 3 and 4.

In the signaling based approach method, the energy saving base station identifies its load information, and if a load maintains a predetermined threshold value or less for a given time, the energy saving base station determines whether to be powered off or shifted to an idle mode or dormant mode.

Also, this determination of the energy saving base station triggers communication with the compensation base station and transmits a coverage compensation request to the compensation base station (cell) in the form of a request message.

The request message may include coverage related information of the energy saving base station that transmits the request message.

Meanwhile, the compensation base station that has received the request message determines whether the energy saving base station that has transmitted the request message may be powered off or shifted to the idle or dormant mode, and may feed the determined result back to the energy saving base station.

If the energy saving base station is powered off or shifted to the idle or dormant mode in accordance with the determined result, the compensation base station may extend its coverage to compensate for a coverage area served by the energy saving base station.

In the environment of multiple coverage compensation base stations shown in FIG. 4, two or more compensation base stations exist. When the signaling based approach method is applied to the environment of multiple coverage compensation base stations shown in FIG. 4, if a coverage compensated by the compensation base stations is not coordinated, problems of a coverage hole and inter-cell interference may occur.

For example, in FIG. 4, it is assumed that cell 4 and cell 5 have low load and cell 6 has high load so as not to compensate for coverages of cell 1 to cell 3. At this time, if the cell 1 to the cell 3 respectively transmit coverage compensation request messages to the cell 4 to the cell 6, the cell 6 cannot compensate for a coverage due to high load in case of no coverage coordination. On the other hand, the cell 4 and the cell 5 may compensate for their coverage within a possible range considering their load with respect to the cell 1 to the cell 3. If the cell 4 and the cell 5 have low load to perform coverage compensation for the cell 1 to the cell 3, coverage areas of the cell 4 and the cell 5 are superimposed on each other after coverage compensation. In this superimposed area, a problem of inter-cell interference may occur. Also, if the cell 4 and the cell 5 only perform coverage compensation of the cell 1 to the cell 3 under the status of FIG. 4, a coverage hole where coverage compensation is not performed may occur in most of the cell 3.

And, as mentioned in the foregoing description, if the energy saving base stations such as the cell 1 to the cell 3 support an MBMS (multimedia broadcast/multicast service) and the cell 4 to the cell 6 correspond to base stations not supporting the MBMS, since there is no separate signaling procedure between the base stations supporting the MBMS and the base station not supporting the MBMS, it is difficult for the base stations to know whether or not the base stations support the MBMS. Hence, a coverage hole where coverage compensation is not performed may occur.

Yet, according to one embodiment of the present invention, if it is able to know beforehand that compensation base stations correspond to compensation base stations configured to support MBMS or it is necessary to perform coverage compensation for a MBMS service, it is able to perform coverage compensation without a coverage hole.

Hence, in case of compensating for coverage of the compensation base stations in such a situation as FIGS. 3 and 4, it is necessary to perform signaling to indicate whether a base station corresponds to a base station supporting a mutual MBMS between an energy saving base station and a compensation base station.

In the following, a method of recognizing whether or not an energy saving base station intending to switch to an idle state and a compensation base station configured to compensate for coverage of the energy saving base station correspond to a base station supporting a mutual MBMS and a method for a neighbor compensation base station to completely compensate for the coverage of the energy saving base station intending to switch to the idle sate are explained.

Figure 5:
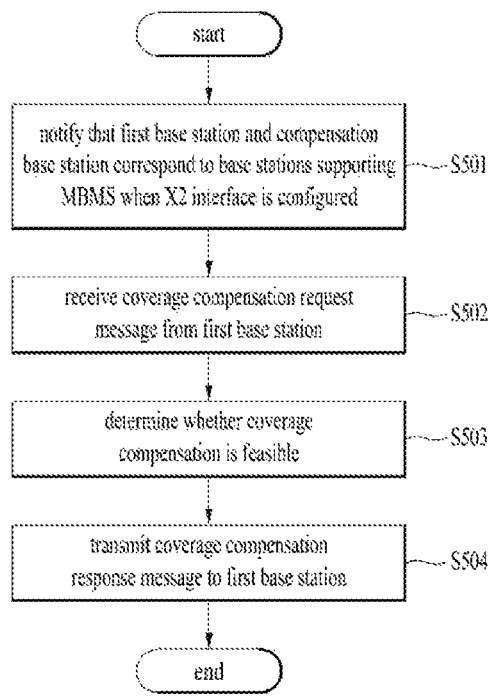
FIG. 5 is a flowchart of a method for a base station to transmit a signal for coverage compensation according to one embodiment of the present invention.

FIG. 5 is a flowchart of a method for a base station to transmit a signal for coverage compensation according to one embodiment of the present invention.

Referring to FIG. 5, in case that a base station supporting MBMS intends to switch to a power-off or an idle state, in order to avoid service interruption of a user equipment receiving an MBMS service from the base station supporting the MBMS, it is necessary to perform appropriate coverage compensation.

Yet, as mentioned in the foregoing description, if a neighbor base station corresponds to a base station not supporting the MBMS, the appropriate coverage compensation cannot be performed. Hence, user equipments, which have been received the MBMS service from the base station supporting the MBMS, are not able to receive an MBMS signal anymore and service interruption may occur.

Hence, it is necessary to solve the problem in a manner of notifying that each of the base station supporting the MBMS and the neighbor base station corresponds to a base station supporting the MBMS.

According to one embodiment of the present invention, as shown in FIG. 5, when the base station supporting the MBMS configures an X2 interface with the neighbor base station, the base station can notify the neighbor base station that the base station corresponds to a base station supporting the MBMS before the base station is switched to a power-off (switch off) or an idle state. Similarly, the neighbor base station can notify the base station supporting the MBMS that the neighbor base station also corresponds to a base station supporting the MBMS [S501].

The notification can be performed in an X2 interface configuration procedure between the two base stations. In particular, the notification can be implemented in a manner of adding a specific field to an X2 interface setup request message or an X2 interface configuration request message or including an indicator in the X2 interface setup request message or the X2 interface configuration request message.

In this case, the X2 interface corresponds to an interface in which communication between base stations is performed in E-UTRAN (evolved UMTS terrestrial radio access network) of LTE system including a user equipment and a base station.

Meanwhile, when the base station supporting the MBMS and the neighbor base station mutually notify and know that each of the base stations corresponds to a base station supporting the MBMS according to the step S501, if the base station supporting the MBMS determines to switch to a power off, an idle or a dormant state, the base station is able to transmit a coverage compensation request message to the neighbor base station to which the X2 interface is set to request coverage compensation. Having set the X2 interface, the neighbor base station can receive the coverage compensation request message [S502].

The coverage compensation request message can include information indicating that the base station is going to switch to a power off, an idle or a dormant state and a request requesting coverage compensation of the base station supporting the MBMS. Moreover, information on a coverage area of the base station supporting the MBMS can also be included in the coverage compensation request message.

And, the coverage compensation request message, which is transmitted by the base station supporting the MBMS, can be transmitted when a cell load of the base station supporting the MBMS equal to or less than a predetermined threshold is maintained for predetermined time.

Meanwhile, having received the coverage compensation request message from the base station supporting the MBMS in the step S502, the neighbor base station performs a determination procedure on whether coverage compensation is feasible after the coverage compensation request message is received. [S503]

Specifically, if the base station supporting the MBMS is switched to a power off, an idle or dormant state, the determination procedure on whether the compensation procedure is feasible can be performed in a manner of including a case of determining whether or not the neighbor base station is able to completely compensate for coverage of the base station supporting the MBMS.

Figure 7:
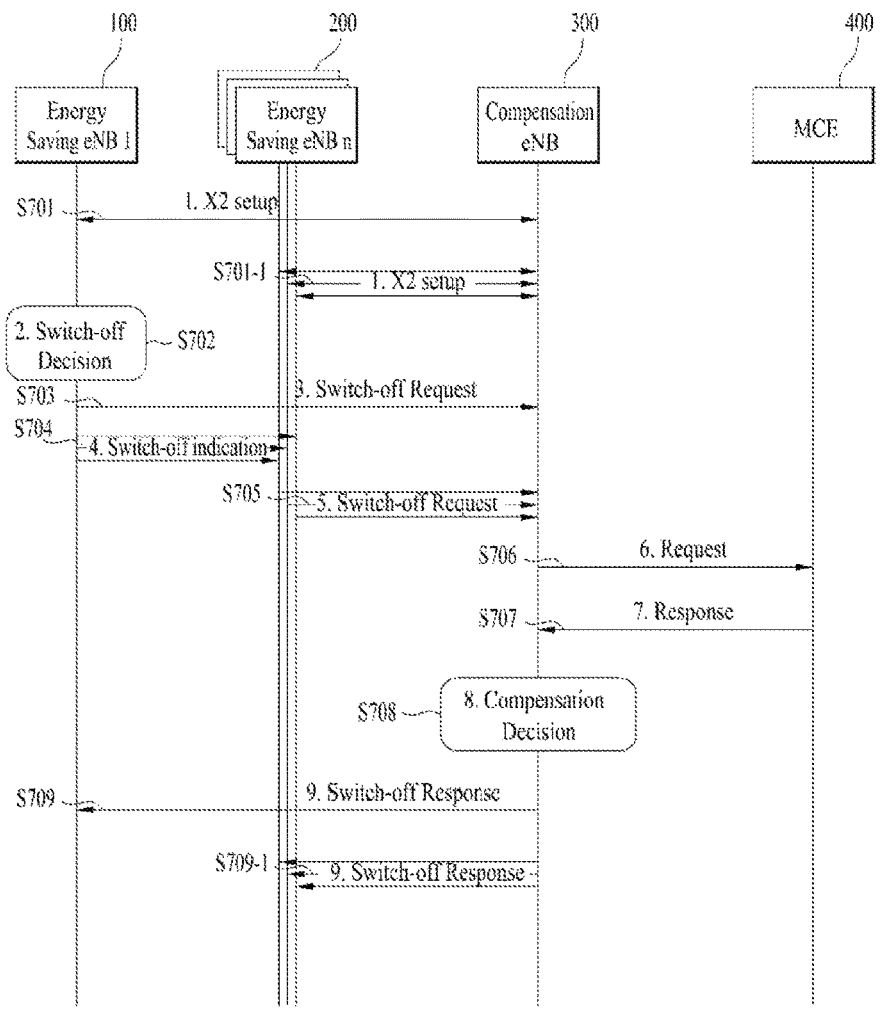
FIG. 7 is a flowchart for an example of a method for a base station to transmit a signal for coverage compensation according to one embodiment of the present invention.

Although the determination procedure on whether coverage compensation is feasible can be determined by the neighbor base station itself, as shown in FIG. 7 in the following, information necessary for determining whether or not the neighbor base station is able to perform coverage compensation is transmitted to an MBMS coordinating entity (MCE), the MBMS coordinating entity determines whether or not the neighbor base station is able to perform coverage compensation and the MBMS coordinating entity notifies the neighbor base station of a result of the determination.

Meanwhile, as a result of determining whether the coverage compensation is feasible, if it is determined as the neighbor base station is able to compensate for the coverage of the base station supporting the MBMS, the neighbor base station can transmit a coverage compensation response message to the base station supporting the MBMS in response to the coverage compensation request message. [S504]

The coverage compensation response message can include information indicating that the neighbor base station can compensate for the coverage of the base station supporting the MBMS and information indicating the base station supporting the MBMS to switch to a power off, an idle or a dormant state. Moreover, the coverage compensation response message can further include concrete information on a coverage area capable of being compensated by the neighbor base station.

Yet, as a result of determining whether the coverage compensation is feasible performed in the step S503, if it is determined as the neighbor base station is unable to compensate for the coverage of the base station supporting the MBMS, the neighbor base station can transmit a coverage compensation response message to the base station supporting the MBMS in response to the coverage compensation request message. In this case, the coverage compensation response message include information indicating that the neighbor base station is unable to compensate for the coverage of the base station supporting the MBMS and information indicating that switching of the base station supporting the MBMS switched to a power off, an idle or a dormant state is restricted. [S504]

Figure 6:
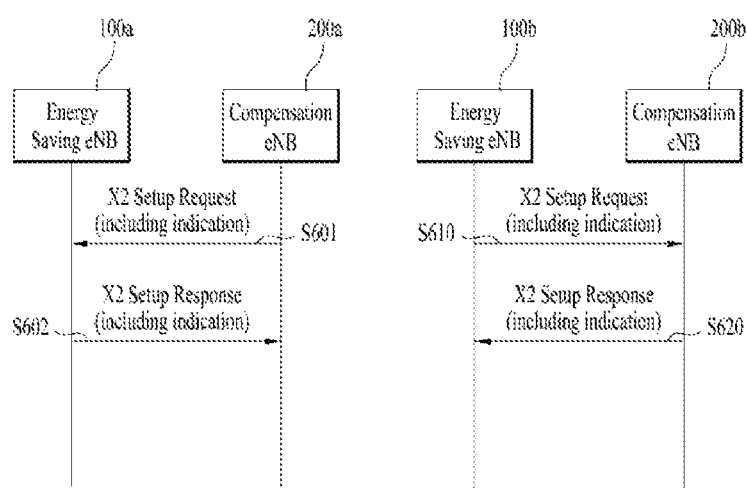
FIG. 6 is a flowchart of an example for a method of recognizing a base station providing a mutual MBMS service between a base station intending to switch to an idle state and a neighbor base station according to one embodiment of the present invention.

FIG. 6 is a flowchart of an example for a method of recognizing a base station providing a mutual MBMS service between a base station intending to switch to an idle state and a neighbor base station according to one embodiment of the present invention.

Referring to FIG. 6, it shows an X2 interface configuration procedure between a base station intending to switch to a power off, an idle or a dormant state and a base station to perform coverage compensation, i.e., between a base station 100a/100b supporting MBMS and a neighbor base station 200a/200b.

In particular, according to one embodiment of the present invention, the base station supporting the MBMS can notify the neighbor base station that the base station corresponds to a base station supporting the MBMS before switching to a power-off or an idle state. Similarly, the neighbor base station can notify the base station supporting the MBMS that the neighbor base station also corresponds to a base station supporting the MBMS. The notification can be performed in an X2 interface configuration procedure between the two base stations.

In more particular, the notification can be implemented in a manner of adding a specific field to an X2 interface setup request message or an X2 interface configuration request message or including an indicator in the X2 interface setup request message or the X2 interface configuration request message in the X2 interface configuration procedure between the two base stations.

Referring back to FIG. 6, first of all, in case that the neighbor base station 200a transmits the X2 interface setup request message for the X2 interface configuration procedure to the base station 100a supporting the MBMS, information indicating that the neighbor base station 200a itself corresponds to a base station supporting MBMS can be included in the X2 interface setup request message. [S601]

Having received the X2 interface setup request message from the neighbor base station 200a according to the step S601, the base station 100a supporting the MBMS can transmit an X2 setup response message to the neighbor base station 200a in response to the X2 interface setup request message. The X2 setup response message can include information indicating that the base station 100a itself supporting the MBMS corresponds to a base station supporting the MBMS. [S602]

In opposition to the aforementioned step S601 to S602, in case that a base station 100b supporting the MBMS preferentially transmits an X2 interface setup request message to a neighbor base station 200b, the X2 interface setup request message transmitted by the base station 200b supporting the MBMS can include information indicating that the base station 200b itself supporting the MBMS corresponds to a base station supporting the MBMS. [S610]

Having received the X2 interface setup request message from the base station 100b supporting the MBMS, the neighbor base station 200b can transmit an X2 interface setup response message in response to the X2 interface setup request message. The X2 setup response message can include information indicating that the neighbor base station 200b itself corresponds to a base station supporting the MBMS. [S620]

FIG. 7 is a flowchart for an example of a method for a base station to transmit a signal for coverage compensation according to one embodiment of the present invention.

Referring to FIG. 7, a base station 100 supporting MBMS corresponds to a base station triggering communication with a neighbor base station 300 and cell coverage of the base station 100 supporting the MBMS and cell coverage of the neighbor base station 300 may not be overlapped with each other.

Meanwhile, the base station 100 supporting the MBMS can perform X2 interface configuration with the neighbor base station 300 according to one embodiment of the present invention before the base station 100 is switched to a power-off or an idle state. When the X2 interface is configured, the base station can notify the neighbor base station that the base station corresponds to a base station supporting the MBMS. Similarly, the neighbor base station can notify the base station supporting the MBMS that the neighbor base station itself also corresponds to a base station supporting the MBMS. [S701]

The notification can be performed in an X2 interface configuration procedure between the two base stations. In particular, the notification can be implemented in a manner of adding a specific field to an X2 interface setup request message or an X2 interface configuration request message or including an indicator in the X2 interface setup request message or the X2 interface configuration request message.

Besides the base station 100 supporting the MBMS, similar to the step S701, other base stations 200 supporting the MBMS can also perform an X2 interface configuration procedure with the neighbor base station. Other base stations and the neighbor base station can mutually notify that each of the base stations also corresponds to a base station supporting the MBMS in the X2 interface configuration procedure. [S701-1]

Meanwhile, after the base stations 100/200 supporting the MBMS and the neighbor base station 300 mutually recognize that each of the base stations support the MBMS according to the aforementioned step S701 to S701-1, the base station 100 supporting the MBMS may be able to determine to switch to a power off, an idle or a dormant state. [S702]

If the base station 100 supporting the MBMS determines to switch to the power off, the idle or the dormant state, it includes a case of maintaining cell load of the base station 100 supporting the MBMS equal to or less than a threshold for predetermined time. This can also be determined by a different predetermined reference.

Meanwhile, having determined to switch to the power off, the idle or the dormant state in the step S702, the base station 100 supporting the MBMS can transmit a switching off request message to the neighbor base station 300, which is known as a base station supporting the MBMS in the step S701. [S703]

The switching off request message can include information indicating that the base station 100 supporting the MBMS has determined to switch to the power off, the idle or the dormant state, information on a coverage compensation request of the base station 100 supporting the MBMS and information on a coverage area of the base station supporting the MBMS.

And, the switching off request message can include MBMS-related information indicating that the base station 100 supporting the MBMS corresponds to a base station supporting the MBMS. In this case, the aforementioned step S701 indicating that the base station 100 itself supporting the MBMS corresponds to the base station supporting the MBMS in the X2 interface configuration procedure can be omitted.

Yet, although it is not depicted in FIG. 7, if cell load of the base station 100 supporting the MBMS exceeds a predetermined threshold after a switching off request message is transmitted by the base station 100 supporting the MBMS, a switching off request withdrawal message can be transmitted by the base station 100 supporting the MBMS to indicate that the base station 100 supporting the MBMS is not switched to the idle or the dormant state. The switching off request message and the switching off request withdrawal message of the base station 100 supporting the MBMS can be distinguished from each other by a value of 0 or 1.

Meanwhile, having transmitted the switching off request message to the neighbor base station 300, the base station 100 supporting the MBMS can transmit a switching off indication message to other base stations 200 supporting MBMS. The switching off indication message can include information for indicating other base stations supporting the MBMS to transmit a switching off request message to the neighbor base station 300. [S704]

Having received the switching off indication message from the base station 100 supporting the MBMS in the step S704, other base stations 200 supporting the MBMS can transmit a switching off request message to the neighbor base station 300, which is known as a base station supporting the MBMS in the step S701-1. [S705]

Meanwhile, having received the switching off request message from the base station 100 supporting the MBMS and other base stations 200 supporting the MBMS, the neighbor base station 300 should determine whether the neighbor base station is able to compensate for coverage of the base station 100 supporting the MBMS and coverage of other base stations 200 supporting the MBMS.

To this end, the neighbor base station 300 can transmit a coverage compensation request message to an MBMS coordinating entity (MCE) 400 to make a request for determining whether coverage compensation is feasible. [S706]

Both the switching off request message received from the base station 100 supporting the MBMS in the step S703 and the switching off request message received from other base stations 200 supporting the MBMS in the step S705 can be included in the coverage compensation request message.

Meanwhile, although it is not depicted in FIG. 7, there may exist a plurality of neighbor base stations 300 capable of supporting MBMS. In this case, if there exists a predetermined master compensation base station among a plurality of the neighbor base stations, the master compensation base station can transmit the coverage compensation request message to the MBMS coordinating entity 400.

If there is no predetermined master compensation base station among a plurality of the neighbor base stations, each of a plurality of the neighbor base stations can transmit the coverage compensation request message to the MBMS coordinating entity 400.

Meanwhile, having transmitted the coverage compensation request message to the MBMS coordinating entity 400, the neighbor base station 300 can receive a coverage compensation response message from the MBMS coordinating entity 400 in response to the coverage compensation request message. [S707]

If there exist a plurality of neighbor base stations 300 capable of supporting MBMS and a master compensation base station transmits a coverage compensation request message to the MBMS coordinating entity 400, the master compensation base station can receive the coverage compensation response message. If there is no master compensation base station and each of a plurality of the neighbor base stations transmits a coverage compensation request message to the MBMS coordinating entity 400, the coverage compensation response message can be received by each of a plurality of the neighbor base stations.

Meanwhile, the coverage compensation response message can include information on whether or not the neighbor base station 300 is able to compensate for coverage of the base station 100 supporting the MBMS and coverage of other base stations 200 supporting the MBMS.

In this case, if the MBMS coordinating entity 400 determines as the neighbor base station 300 is able to compensate for the coverage of the base station 100 supporting the MBMS and the coverage of other base stations 200 supporting the MBMS, the coverage compensation response message can include MBMS information related to an MBMS service provided by the base station 100 supporting the MBMS and an MBMS service provided by other base stations 200 supporting the MBMS.

Meanwhile, having received the coverage compensation response message from the MBMS coordinating entity 400, the neighbor base station 300 determines whether or not coverage compensation is feasible in consideration of determination on whether the coverage compensation received from the MBMS coordinating entity 400 is feasible, the MBMS information related to the MBMS service and the like. [S708]

Subsequently, it is able to determine whether to switch to a power-off, an idle or a dormant state of the base station 100 supporting the MBMS and other base stations 200 supporting the MBMS according to the aforementioned determination. A result of the determination can be included in a switching off response message and the switching off response message can be transmitted to each of the base station 100 supporting the MBMS and other base stations 200 supporting the MBMS. [S709, S709-1]

If there exist a plurality of neighbor base stations and there is a predetermined master compensation base station among a plurality of the neighbor base stations, the switching off response message can be transmitted by the master compensation base station. If there exist a plurality of neighbor base stations but there is no master compensation base station, each of a plurality of the neighbor base stations can transmit the switching off response message to each of the base station 100 supporting the MBMS and other base stations 200 supporting the MBMS.

Meanwhile, although it is not depicted in FIG. 7, having received the switching off response message from the neighbor base station 300, if determination on switching to a power off, an idle or dormant state and indication information on the determination are included in the switching off response message, the base station 100 supporting the MBMS and other base stations 200 supporting the MBMS can immediately perform switching to the power off, the idle or the dormant state according to the switching decision and the indication information. On the contrary, each of the base station 100 supporting the MBMS and other base stations 200 supporting the MBMS may be able to determine whether to switch to the power off, the idle or the dormant state in consideration of the switching determination and the indication information.

Figure 8:
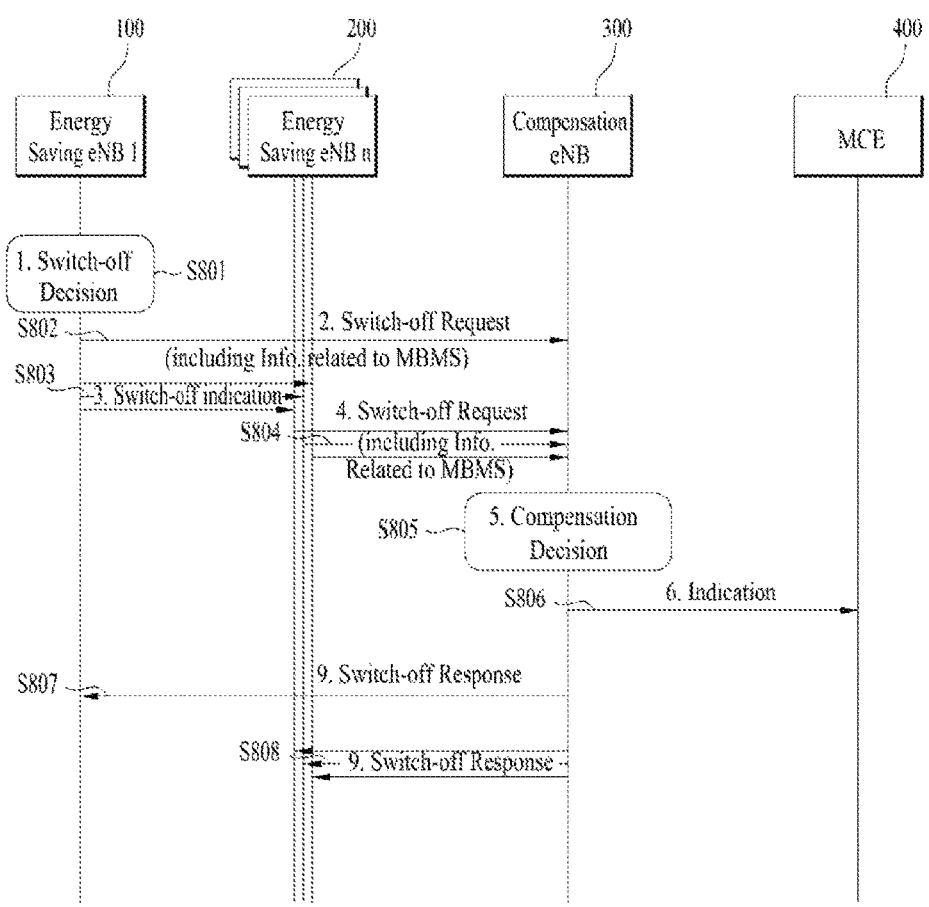
FIG. 8 is a flowchart for an example of a method for a base station to transmit a signal for coverage compensation according to one embodiment of the present invention.

FIG. 8 is a flowchart for an example of a method for a base station to transmit a signal for coverage compensation according to one embodiment of the present invention.

Referring to FIG. 8, a base station 100 supporting MBMS can determine to switch to a power off, an idle or a dormant state according to one embodiment of the present invention. [S801]

If the base station 100 supporting the MBMS determines to switch to the power off, the idle or the dormant state, it includes a case of maintaining cell load of the base station 100 supporting the MBMS equal to or less than a threshold for predetermined time. This can also be determined by a different predetermined reference.

Meanwhile, having determined to switch to the power off, the idle or the dormant state in the step S801, the base station 100 supporting the MBMS can transmit a switching off request message (coverage compensation request message) to a neighbor base station 300. [S802]

The switching off request message (coverage compensation request message) can include information indicating that the base station 100 supporting the MBMS has determined to switch to the power off, the idle or the dormant state, information on a coverage compensation request of the base station 100 supporting the MBMS and information on a coverage area of the base station supporting the MBMS.

And, the switching off request message (coverage compensation request message) can include information indicating that the base station 100 itself supporting the MBMS corresponds to a base station supporting the MBMS and MBMS-related information including information indicating whether there exists a user to which an MBMS service is provided by the base station 100 supporting the MBMS.

Meanwhile, the base station 100 supporting the MBMS, which has transmitted the switching off request message (coverage compensation request message) to the neighbor base station 300, can transmit a switching off indication message to other base stations 200 supporting the MBMS. The switching off indication message can include information indicating other base stations 200 supporting the MBMS to transmit a switching off request message (coverage compensation request message) to the neighbor base station 300. [S803]

Having received the switching off indication message from the base station 100 supporting the MBMS in the step S803, other base stations 200 supporting the MBMS can transmit a switching off request message (coverage compensation request message) to the neighbor base station 300. [S804]

In this case, the switching off request message (coverage compensation request message) in the step S804 can include information indicating that each of other base stations 200 supporting the MBMS corresponds to a base station supporting the MBMS and MBMS-related information including information indicating whether there exists a user to which an MBMS service is provided by other base stations 200 supporting the MBMS.

Meanwhile, having received the switching off request message (or coverage compensation request message) from the base station 100 supporting the MBMS and other base stations 200 supporting the MBMS, the neighbor base station 300 should determine whether the neighbor base station is able to compensate for coverage of the base station 100 supporting the MBMS and coverage of other base stations 200 supporting the MBMS.

The neighbor base station 300 determines whether to compensate for the coverage of the base station 100 supporting the MBMS and the coverage of other base stations 200 supporting the MBMS using the information indicating the determination on switching to the power off, the idle or the dormant state included in the previously received switching off request message (coverage compensation request message), the information on a coverage compensation request, the information on a coverage area, MBMS-related information indicating a base station supporting MBMS, and the information indicating whether there exists a user to which an MBMS service is provided by the base stations 100/200 supporting the MBMS.

If the neighbor base station 300 determines to compensate for the coverage of the base station 100 supporting the MBMS and the coverage of other base station 200 supporting the MBMS, the neighbor base station 300 transmits the information indicating the determination on switching to the power off, the idle or the dormant state, the MBMS-related information indicating a coverage compensation request, information on a coverage area and a base station supporting MBMS and the like to the MBMS coordinating entity 400. By doing so, the neighbor base station 300 is able to notify that the neighbor base station has determined to compensate for the coverage of the base station 100 supporting the MBMS and the coverage of other base station 200 supporting the MBMS.

Subsequently, the neighbor base station 300 can transmit a switching off response message (coverage compensation response message) to each of the base station 100 supporting the MBMS and other base stations 200 supporting the MBMS. [S807, S808]

And, the switching off response message (coverage compensation response message) can include a result of whether the base station 100 supporting the MBMS and other base stations 200 supporting the MBMS are determined to switch to the power off, the idle or the dormant state and indication information on the result.

Meanwhile, although it is not depicted in FIG. 8, having received the switching off response message (coverage compensation response message) from the neighbor base station 300, if the switching off response message (coverage compensation response message) includes information indicating decision on switching to the power off, the idle or the dormant state and indication information on the decision, the base station 100 supporting the MBMS and other base stations 200 supporting the MBMS can immediately perform switching to the power off, the idle or the dormant state according to the switching decision and the indication information. On the contrary, each of the base station 100 supporting the MBMS and other base stations 200 supporting the MBMS may be able to determine to switch to the power off, the idle or the dormant state in consideration of the switching decision and the indication information.

Figure 9:
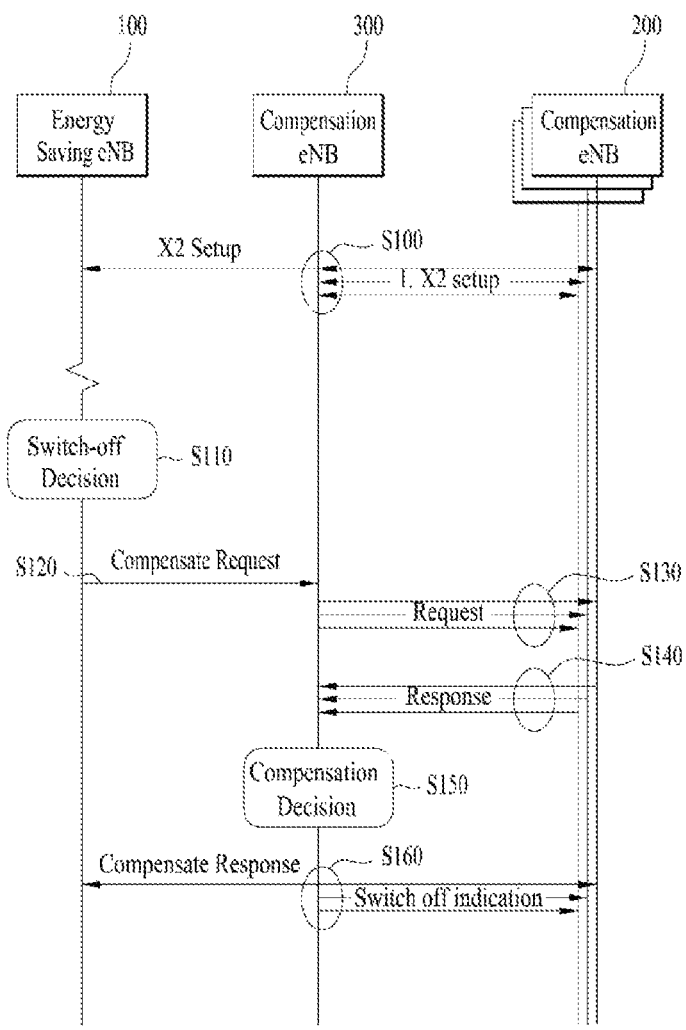
FIG. 9 is a flowchart for an example of a method for a base station to transmit a signal for coverage compensation according to one embodiment of the present invention.

FIG. 9 is a flowchart for an example of a method for a base station to transmit a signal for coverage compensation according to one embodiment of the present invention.

Referring to FIG. 9, a base station 100 supporting MBMS corresponds to a base station triggering communication with a neighbor base station 300. According to one embodiment of the present invention, when an X2 interface is configured with the neighbor base station 300, the base station 100 supporting the MBMS can notify the neighbor base station that the base station corresponds to a base station supporting the MBMS before the base station is switched to a power off or an idle state. [S100]

Similarly, the neighbor base station 300 can notify the base station 100 supporting the MBMS that the neighbor base station also corresponds to a base station supporting the MBMS in the X2 interface configuration procedure.

Besides the base station 100 supporting the MBMS, similar to the step S100, other base stations 200 supporting the MBMS can also perform an X2 interface configuration procedure with the neighbor base station 300. In the X2 interface configuration procedure, the neighbor base station and other base stations can mutually notify that the base stations correspond to base stations supporting the MBMS.

In particular, the notification can be performed in the X2 interface configuration procedure between two base stations. In particular, the notification can be implemented in a manner of adding a specific field to an X2 interface setup request message or an X2 interface configuration request message or including an indicator in the X2 interface setup request message or the X2 interface configuration request message.

Yet, if the base station 100 supporting the MBMS is not a base station supporting MBMS, the step S100 can be performed by a general X2 interface configuration procedure in which the specific field or the indicator is not included.

Meanwhile, after the base stations 100/200 supporting the MBMS and the neighbor base station 300 are mutually aware that each of the base stations corresponds to a base station supporting the MBMS in a manner of notifying via the X2 interface configuration procedure according to the step S100 of FIG. 9, the base station 100 supporting the MBMS may determine to switch to a power off, an idle or a dormant state.

If the base station 100 supporting the MBMS determines to switch to the power off, the idle or the dormant state, it includes a case of maintaining cell load of the base station 100 supporting the MBMS equal to or less than a threshold for predetermined time. This can also be determined by a different predetermined reference.

Having determined to switch to the power off, the idle, or the dormant state, the base station 100 supporting the MBMS can transmit a switching off request message (coverage compensation request message) in which a coverage compensation request is included to the neighbor base station 300, which is known as a base station supporting MBMS in the step S100. [S120]

The switching off request message (coverage compensation request message) can include information indicating that the base station 100 supporting the MBMS has determined to switch to the power off, the idle or the dormant state, information on a coverage compensation request of the base station 100 supporting the MBMS and information on a coverage area of the base station supporting the MBMS.

Meanwhile, having received the switching off request message (coverage compensation request message) from the base station 100 supporting the MBMS, the neighbor base station 300 can transmit a state information request message to other base stations 200 supporting MBMS to collect state information on other base stations 200 supporting the MBMS. [S130]

Subsequently, the neighbor base station 300 can receive a state information response message from other base stations supporting the MBMS in response to the state information request message. The state information response message can include state information on other base stations 200 supporting the MBMS. [S140]

In this case, the state information can include a cell load of other base stations 200 supporting the MBMS, information on whether an MBMS service is currently provided to a user equipment, the number of user equipments to which an MBMS service is currently provided, and the like.

Meanwhile, having received the state information response message, the neighbor base station 300 determines whether or not coverage compensation of the base station 100 supporting the MBMS and coverage compensation of other base stations 200 are feasible using the state information on other base stations 200 supporting the MBMS included in the state information response message and the switching off request message (coverage compensation request message) received from the base station 100 supporting the MBMS. [S150]

Although it is not depicted in FIG. 9, as mentioned earlier in FIG. 7, a determination of the neighbor base station 300 determining whether or not coverage compensation of the base station 100 supporting the MBMS and coverage compensation of other base stations 200 are feasible can also be performed by an MBMS coordinating entity.

Meanwhile, if the neighbor base station 300 determines to compensate for the coverage of the base station 100 supporting the MBMS and the coverage of other base stations 200 supporting the MBMS in the step S150, the neighbor base station 300 can transmit a compensation response message capable of including the determination, the information indicating the determination on switching to the power off, the idle or the dormant state, the MBMS-related information indicating a coverage compensation request, information on a coverage area and a base station supporting MBMS and the like to the base station 100 supporting the MBMS. [S160]

A switching off indication message (coverage compensation response message) indicating a switching off can be transmitted to each of other base stations 200 supporting the MBMS. [S160]

Yet, if the neighbor base station 300 determines not to compensate for the coverage of the base station 100 supporting the MBMS and the coverage of other base stations 200 supporting the MBMS, more particularly, if it is determined as the neighbor base station 300 is unable to compensate for the coverage of the base station 100 supporting the MBMS and the coverage of other base stations 200 by coverage of the neighbor base station 300, the neighbor base station can indicate both the base station 100 supporting the MBMS and other base stations 200 supporting the MBMS not to perform a switching off. Or, the neighbor base station can transmit a message indicating a switching off to be performed to base stations capable of performing coverage compensation only.

Figure 10:
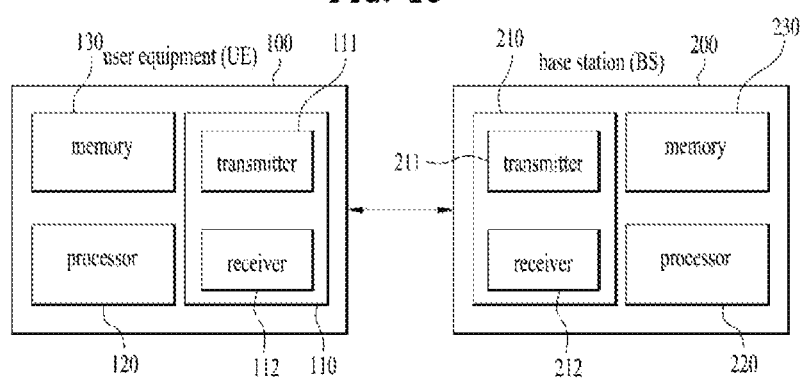
FIG. 10 is a block diagram for a device transmitting a signal for coverage compensation according to one embodiment of the present invention.

FIG. 10 is a block diagram for a device transmitting a signal for coverage compensation according to one embodiment of the present invention.

Although FIG. 10 shows 1:1 communication environment between a user equipment 100 and a base station 220, communication environment can be constructed between a plurality of user equipments and a base station. Moreover, communication environment can be constructed between a user equipment and a user equipment or between a base station and a base station.

Referring to FIG. 10, a wireless communication system to which the present invention is applicable can include a user equipment 100 and a base station 200. The base station 200 can include a radio frequency unit 210 including a transmitter 211 and a receiver 212, a processor 220 and a memory 230.

Overall communication process of the base station 200 such as signal processing, layer processing and the like are controlled by the processor 220 and the memory 230. And, it may be able to form a connection relation among the RF unit 210, the processor 220 and the memory 230.

The RF unit 210 included in the base station 200 can include the transmitter 211 and the receiver 212. The transmitter 211 and the receiver 212 can be configured to transceive a signal with the user equipment 100 or other base stations.

The processor 220 is functionally connected with the transmitter 211 and the receiver 212 included in the RF unit.

The processor 220 can be configured to control a process that the transmitter 211 and the receiver 212 transceive a signal with the user equipment 100 and other base stations. And, the processor 220 performs various processing on a signal to be transmitted, transmits the signal to the transmitter 211 and may be able to perform processing on a signal received by the receiver 212.

If necessary, the processor 220 can store information included in an exchanged message in the memory 230. With this structure, the base station 200 can perform various embodiments of the present invention mentioned earlier in FIG. 1 to FIG. 9.

An RF unit 110 included in the user equipment 100 can include a transmitter 111 and a receiver 112. The RF unit 110 is configured to transceive a signal with the base station 200. A processor 120 of the user equipment 100 is functionally connected with the transmitter 111 and the receiver 112. The processor 120 can be configured to control a process that the transmitter 111 and the receiver 112 transceive a signal with other devices including the base station 200.

And, the processor 120 performs various processing on a signal to be transmitted, transmits the signal to the transmitter 111 and may be able to perform processing on a signal received by the receiver 112.

If necessary, the processor 120 can store information included in an exchanged message in the memory 130.

The processor 120/220 of the user equipment 100 and the base station 200 indicates (e.g., controls, adjusts, manages, etc.) operations of the user equipment 100 and the base station 200. Each of the processors 120/220 can be connected with the memories 130/230 capable of storing program codes and data. The memory 130/230 is connected with the processor 120/220 and may be able to store an operating system, an application and general files.

The processor 120/220 of the present invention can be called a controller, microcontroller, microprocessor microcomputer and the like. Meanwhile, the processor 120/220 can be implemented by hardware, firmware and/or any combinations thereof.

In case of the implementation by firmware or software, a method according to each embodiment of the present invention can be implemented by modules, procedures, and/or functions for performing the above-explained functions or operations. Software code is stored in the memory 130/230 and is then drivable by the processor 120/220. The memory is provided within or outside the user equipment and the base station 200 to exchange data with the processor 120/220 through the various means known in public.

In case of implementing embodiments of the present invention by hardware, ASICs (application specific integrated circuits), DSPs (digital signal processors), DSPDs (digital signal processing devices), PLDs (programmable logic devices), FPGAs (field programmable gate arrays), etc. can be installed in the processor 120/220 to perform the present invention.

Meanwhile, the aforementioned method can be made by a program executable in a computer and can be implemented in a common digital computer operating the program using a computer readable media. And, a data structure used in the method can be recorded in a computer readable media by various means. Program storing devices, which are usable for explaining a storing device including executable computer codes, for performing various methods of the present invention should not be understood as including temporary targets such as carrier waves and signals. The computer readable media includes such a storing media as a magnetic storing media (e.g., ROM, floppy disc, hard disc, etc.) and an optical reading media (e.g., CD-ROM, DVD, etc.).

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting a signal for coverage compensation according to the present invention can be applied to various wireless communication systems.

What is claimed is:

1. A method of transmitting a signal for coverage compensation by a compensation base station in a wireless communication system, the method comprising:
receiving, from a first base station, first information indicating that the first base station supports a Multimedia Broadcast/Multicast Service (MBMS) service;
transmitting, to the first base station, second information indicating that the compensation base station supports the MBMS service, as a part of an X2 interface configuration procedure,
wherein the first base station is in a state of which switching off is available;
receiving, from the first base station, a coverage compensation request message including MBMS-related information of the first base station;
transmitting, to an MBMS Coordinating Entity (MCE), the coverage compensation request message;
receiving, from the MCE, a message indicating whether to compensate for a coverage of the first base station; and
transmitting, to the first base station, a coverage compensation response message indicating whether the compensation base station compensates for the coverage of the first base station.

2. The method of claim 1,
wherein the MBMS-related information comprises information indicating whether or not there exists any user to which the MBMS service is provided by the first base station.

3. The method of claim 1, wherein the compensation base station is a predetermined master compensation base station among a plurality of compensation base stations.

4. The method of claim 1, wherein the coverage compensation response message is used for the first base station to directly determine switching off and whether to perform the coverage compensation.

5. The method of claim 1, wherein the coverage compensation request message is received from the first base station when a cell load of the first base station maintains a value equal to or less than a predetermined threshold during a time determined in advance.

6. The method of claim 1, further comprising:
providing the MBMS service continuously to one or more user equipments to which the MBMS service is provided from the first base station, when the coverage compensation response message includes information indicating that the compensation base station compensates for the coverage of the first base station.

7. The method of claim 1, wherein a coverage area of the compensation base station and a coverage area of the first base station are not overlapped with each other.

8. A device transmitting a signal for coverage compensation in a wireless communication system, comprising:
- a radio frequency (RF) unit comprising a transmitter and a receiver; and
- a processor configured to:
    - control the RF unit to receive, from a first base station, first information indicating that the first base station supports an Multimedia Broadcast/Multicast Service (MBMS) service,
    - control the RF unit to transmit, to the first base station, second information indicating that the compensation base station supports the MBMS service, as a part of an X2 interface configuration procedure,
    - wherein the first base station is in a state of which switching off is available,
    - control the RF unit to receive, from the first base station, a coverage compensation request message including MBMS-related information of the first base station,
    - control the RF unit to transmit, to an MBMS Coordinating Entity (MCE), the coverage compensation request message,
    - control the RF unit to receive, from the MCE, a message indicating whether to compensate for coverage of the first base station, and
    - control the RF unit to transmit, to the first base station, a coverage compensation response message including information indicating whether the compensation base station compensates for the coverage of the first base station.

* * * * *